US006565074B1

(12) United States Patent
Wheeler

(10) Patent No.: US 6,565,074 B1
(45) Date of Patent: May 20, 2003

(54) ROTARY CLAMP HAVING AN ADJUSTABLE PRE-STOP

(75) Inventor: Timothy Wheeler, Shelby Township, MI (US)

(73) Assignee: Norgren Automotive, Inc.

( * ) Notice: Subject to any disclaimer, the term of this patent is extended or adjusted under 35 U.S.C. 154(b) by 0 days.

(21) Appl. No.: 09/892,107

(22) Filed: Jun. 26, 2001

(51) Int. Cl.[7] .................................................. B23Q 3/08

(52) U.S. Cl. ........................... 269/32; 269/228; 269/27; 269/91

(58) Field of Search ............................ 269/32, 228, 27, 269/24, 201, 233, 91, 93, 238

(56) References Cited

U.S. PATENT DOCUMENTS

| | | | | |
|---|---|---|---|---|
| 4,021,027 A | * 5/1977 | Blatt | ........................... | 269/32 |
| 4,602,704 A | 7/1986 | Modolo | | |
| 4,620,696 A | 11/1986 | Blatt | | |
| 5,799,932 A | * 9/1998 | Blatt | ........................... | 269/32 |
| 5,845,897 A | * 12/1998 | Tunkers | ....................... | 269/32 |
| 5,996,984 A | * 12/1999 | Takahashi | .................... | 269/32 |
| 6,076,816 A | * 6/2000 | Tunkers | ....................... | 269/32 |
| 6,416,045 B1 | * 7/2002 | Morroney | .................... | 269/32 |

* cited by examiner

*Primary Examiner*—Lee D. Wilson
(74) *Attorney, Agent, or Firm*—Young & Basile, P.C.

(57) ABSTRACT

A rotary clamp having an adjustable pre-stop wherein the rotary clamp includes a linear actuator for transmitting linear motion to a linkage assembly. The linkage assembly converts the linear motion into rotary motion of a clamp arm, wherein the clamp arm moves between a clamped position and an unclamped position. The adjustable pre-stop provides a substantially cylindrical member having a substantially polygonal shaped surface formed on the cylindrical member. The polygonal surface matingly engages a substantially polygonal shaped aperture formed in the housing of the rotary clamp. An eccentric mid-portion of the cylindrical member engages the linkage assembly in the clamped position to prohibit the clamp arm from rotating beyond the clamped position. The eccentric mid-portion provides a plurality of predetermined radial distances extending from the longitudinal axis corresponding to predetermined rotational positions of the hexagonal surface relative to the hexagonal aperture, wherein the predetermined radial distances correspond to predetermined incremental angular adjustments of the clamp arm in the clamped position.

18 Claims, 3 Drawing Sheets

ROTARY CLAMP HAVING AN ADJUSTABLE PRE-STOP

FIELD OF THE INVENTION

The present invention relates, in general, to rotary clamps, and more particularly, to a rotary clamp having an adjustable pre-stop that allows for incremental adjustments of a clamp arm in a clamped position.

BACKGROUND OF THE INVENTION

Rotary clamps are known of the type in which linear actuator reciprocating movement is adapted to be translated into rotary movement of a clamp arm. The linear actuator is powered by a fluid motor, and a linkage assembly converts the linear actuator movement into rotary motion of the clamp arm. The clamp arm typically clamps a workpiece against a workpiece engaging surface. Thus, it is critical that the clamp arm repeatedly and accurately position itself in a clamped position.

It is known to utilize positive stops or pre-stops to prevent the clamp arm from exceeding a predetermined position. It is also known to utilize an eccentric pre-stop that may be rotatably adjusted to cooperatively engage the clamp arm in the clamping position. The eccentric pre-stop may be rotatably adjusted to eliminate any variation in the arm position due to a loose linkage mechanism. However, the eccentric pre-stops of past designs provide an infinite number of clamping positions for the clamp arm thereby making it difficult to utilize repeatable settings on the pre-stop. In addition, the eccentric pre-stop may be susceptible to rotational movement should the fastener that holds the eccentric pre-stop become slightly loose.

It would be desirable to provide an adjustable pre-stop that provided predetermined positions corresponding to various rotary positions of the clamp arm in the clamped position. In addition, it would also be desirable to provide an adjustable pre-stop that was not susceptible to rotational movement upon the loosening of its fastener.

SUMMARY OF THE INVENTION

The present invention overcomes the above-noted shortcomings by providing a rotary clamp having an adjustable pre-stop. The rotary clamp includes means for converting linear actuator motion between a first position and a second position into rotary clamp motion between an unclamped position and a clamped position, respectively. The converting means is disposed within a housing of the rotary clamp wherein the housing provides at least one shaped aperture formed therein. A substantially cylindrical member having a longitudinal axis has at least one shaped surface for matingly engaging the shaped aperture in the housing. The cylindrical member also provides an eccentric outer portion relative to the longitudinal axis for engaging the converting means to prohibit said converting means from moving beyond the clamped position. The eccentric outer portion creates a plurality of predetermined radial distances extending from the longitudinal axis of the cylindrical member. The radial distances correspond to predetermined rotational positions of said shaped surface within the shaped aperture of the housing wherein said predetermined radial distances correspond to predetermined incremental angular adjustments of said converting means in said clamped position. An indicia may be provided on the shaped surface of the cylindrical member to indicate the position of the cylindrical member relative to the shaped aperture in said housing.

Other options and features of the invention will become apparent by reference to the following specifications and drawings.

BRIEF DESCRIPTION OF THE DRAWINGS

In the drawings, like referenced numerals refer to similar elements, throughout the various views.

DESCRIPTION OF THE PREFERRED EMBODIMENT

Figure 1:
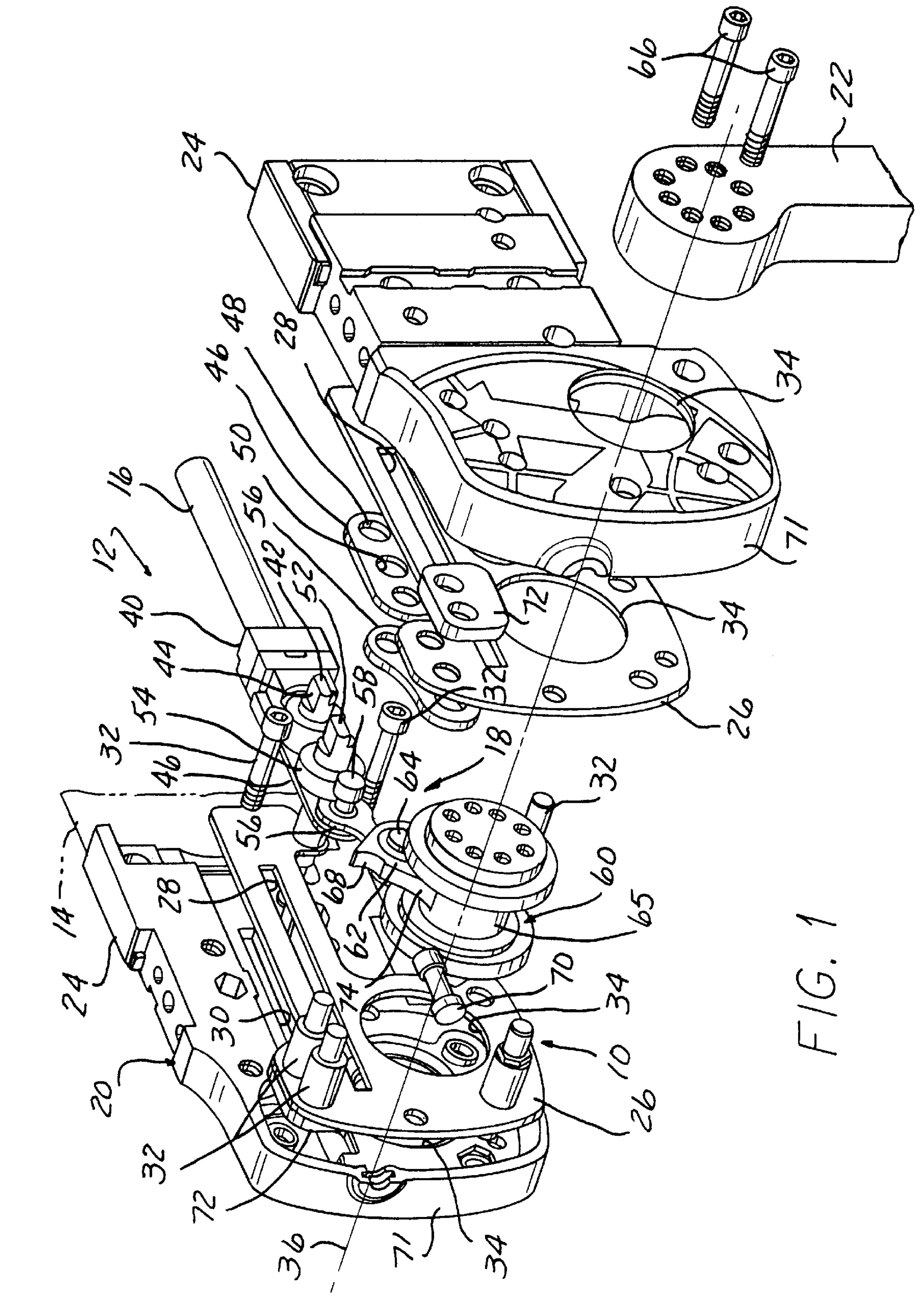
FIG. 1 is an exploded view of a rotary clamp utilizing the adjustable pre-stop of the present invention.

Referring to the drawings, the present invention will now be described in detail with reference to the preferred embodiment.

FIGS. 1–5 illustrate a rotary clamp 12 having an adjustable pre-stop 10 defined by the present invention. The adjustable pre-stop 10 is utilized within the rotary clamp 12 which is actuated by means of a fluid cylinder or linear actuator 14. The linear actuator 14 provides a piston (not shown) attached to the end of a piston rod 16. The fluid cylinder or linear actuator 14 is preferably pneumatic, but the fluid cylinder or linear actuator 14 may also be hydraulic. The linear actuator 14 provides linear reciprocating movement to the piston rod 16 which, in turn, is coupled to a linkage assembly 18 of the rotary clamp 12. The linkage assembly 18 is disposed within a housing 20 of the rotary clamp 12 and converts the linear motion of the piston rod 16 into rotary motion of a clamp arm 22. The reciprocal linear movement of the linear actuator 14 and piston rod 16 correspond to reciprocal rotary movement of the clamp arm 22 between a clamped position and an unclamped position.

The housing 20 of the rotary clamp 12 is formed by two bilateral halves 24 wherein one end of the housing 20 is attached to the linear actuator 14 and the other end of the housing 20 is closed. The end of the housing 20 connected to the linear actuator 14 is open to receive the free end of the piston rod 16. The two halves 24 of the housing 20 form a hollow portion having a pair of laminated plates 26 disposed therein. Each of the laminated plates 26 provides an elongated guide slot 28 that is aligned with an elongated guide slot 30 formed in the inner surfaces of the two halves 24 of the housing 20. The two halves 24 of the housing 20 and the pair of laminated plates 26 are connected together by fasteners 32. The housing 20 also includes a series of coaxial apertures 34 extending through the two halves 24 and the laminated plates 26 of the housing 20. The coaxial apertures 34 have a common axis 36 offset from and perpendicular to a longitudinal axis 38 of the guide slots 28, 30.

To connect the piston rod 16 to the linkage assembly 18, a rod end 40 having a U-shaped block structure threadingly engages and receives a stem-like portion of the free end of the piston rod 16. The rod end 40 provides a pin 42 that extends through an aperture provided in the rounded end of the U-shaped portion. Each end of the pin 42 has substantially flat parallel landings 44 that engage the elongated guide slots 28, 30 of the housing 20. The pin 42 is pivotally connected to a pair of substantially parallel linkage members 46 wherein each linkage member 46 has apertures 48 extending therethrough for receiving pin 42. The apertures 48 may also be elongated (shown in hidden lines) to offer movement of the pin 42 within aperture 48 during movement of the rotary clamp 12 between the clamped and unclamped positions. The linkage members 46 also provide a second aperture 50 extending therethrough for receiving a second pin 52 similar to pin 42. Pin 52 is also received by an aperture extending through a substantially circular rubber roller 54 disposed between the linkage members 46. The substantially flat landings of the pin 52 similarly engage the elongated slots 28, 30 of the housing 20 as described for pin 42.

Figure 2:
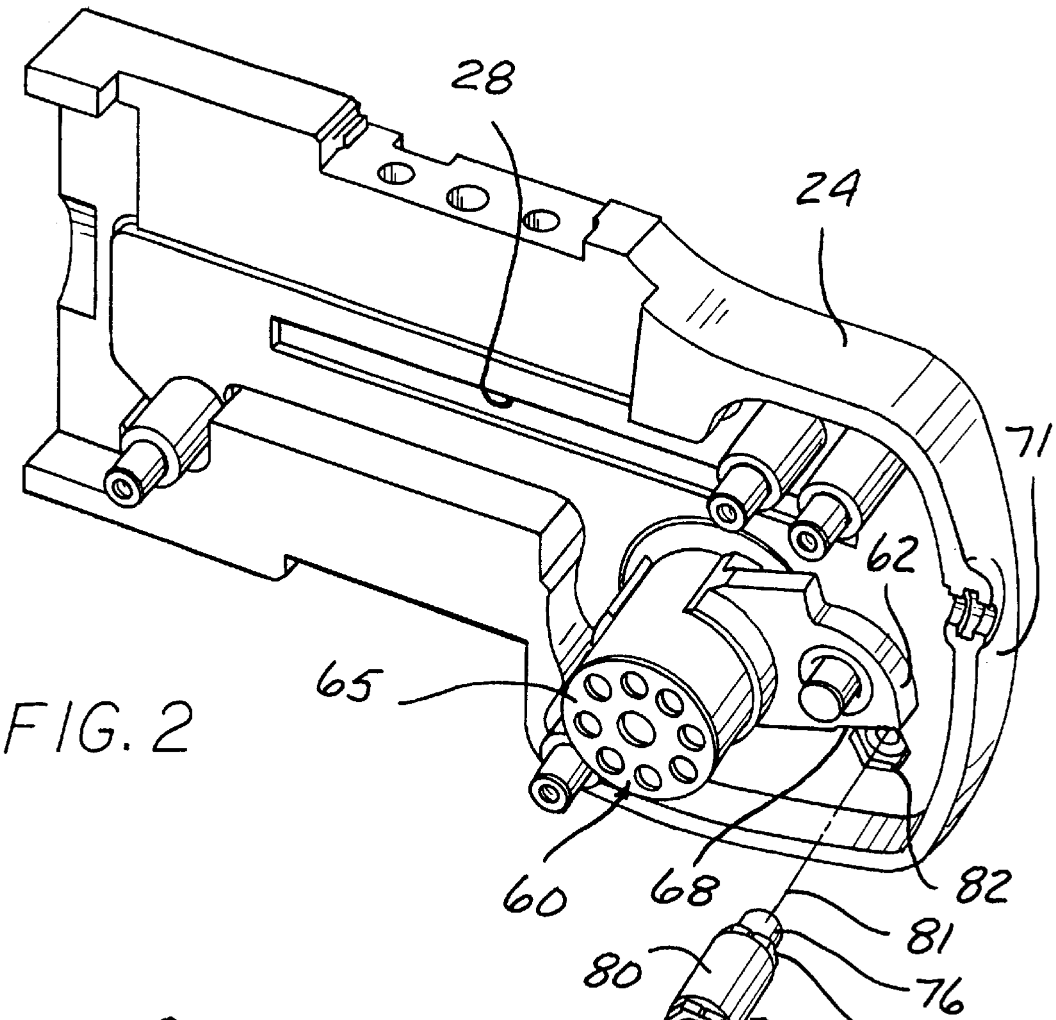
FIG. 2 is a partial exploded view of the rotary clamp housing and the adjustable pre-stop of the present invention.
Figure 5:
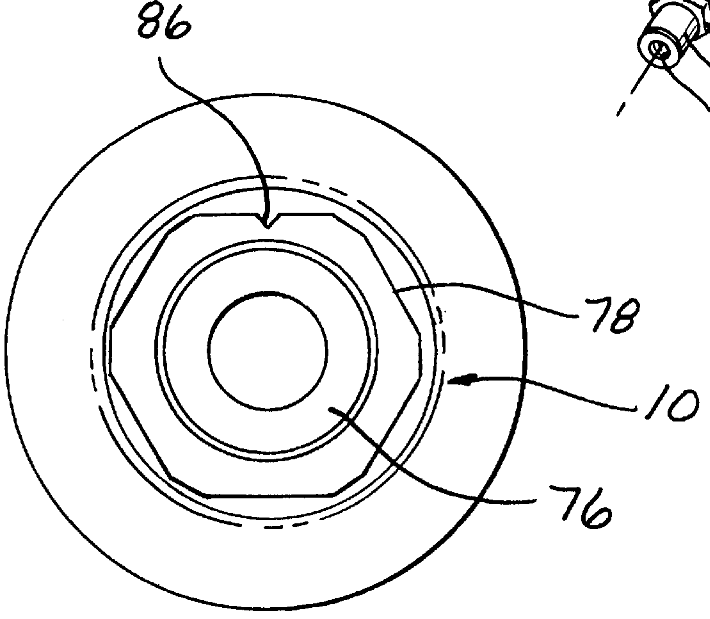
FIG. 5 is a sectional view of the adjustable pre-stop taken in the direction of arrows 5—5 in FIG. 3.
Figure 3:
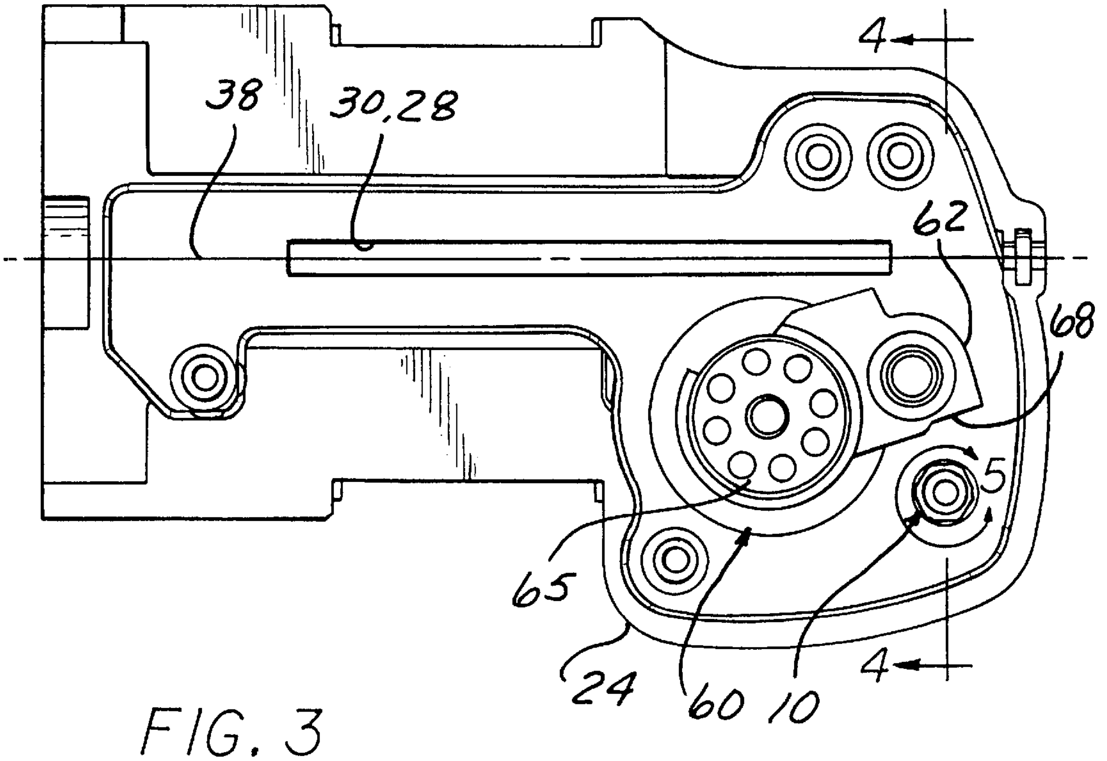
FIG. 3 is a front view of the adjustable pre-stop mounted in the housing of a rotary clamp.
Figure 4:
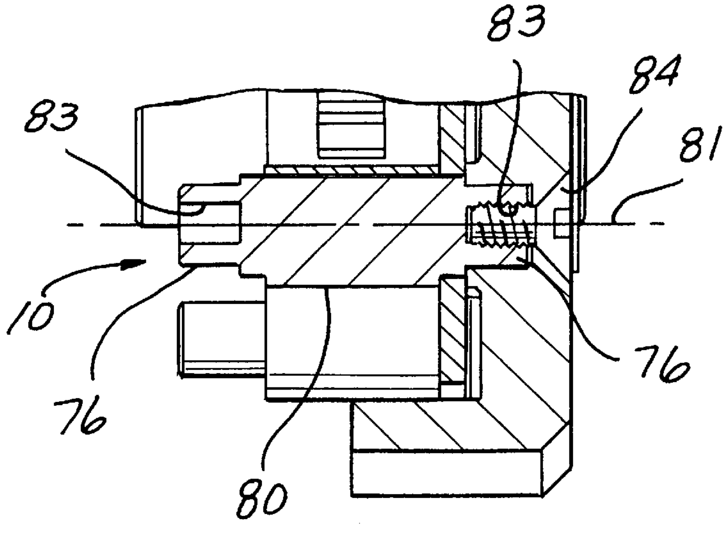
FIG. 4 is a sectional view of the adjustable pre-stop shown in the direction of arrows 4—4 in FIG. 3.

The linkage assembly 18 is further defined by the linkage members 46 being pivotally connected to a pair of substantially parallel links 56. At one end of links 56, a pin 58 extends through corresponding apertures provided in the linkage members 46 and the links 56. At the opposite end of links 56, the links 56 are pivotally connected to a shaft link 60. The shaft link 60 includes a lever arm 62 having an aperture extending therethrough. A pin 64 is inserted through aligned apertures provided in links 56 and lever arm 62 of the shaft link 60. The shaft link 60 also includes a pivot pin 65 integrally connected to the lever arm 62. The pivot pin 65 is substantially cylindrical and is rotatably disposed within the coaxial apertures 34 provided in the housing 20 so that a portion of the pivot pin 65 extends slightly outward from the housing 20. The clamp arm 22 is connected to a portion of the pivot pin 65 that extends slightly outward from the housing 20 by fasteners 66. The shaft link 60 also provides a positive stop 68 integrally formed in the lever arm 62. The positive stop 68 engages the adjustable pre-stop 10 which extends between the interior walls of the housing 16. The positive stop 68 may provide either a substantially flat surface, as shown in FIGS. 2 and 3, or an arcuate surface, as shown in FIG. 1, for engaging the adjustable pre-stop 10 and limiting the travel of the clamp arm 22 in the clamped position.

Even though the rotary clamp 12 is designed not to open unexpectedly upon the loss of power and/or air pressure to the linear actuator 14, it may be desirable to move the rotary clamp 12 to the unclamped position in order to release a workpiece (not shown) or reset the linkage assembly 18. A reciprocal member 70 is slideably disposed within an aperture provided within an end wall 71 of the housing 20. The reciprocal member 70 has a cylindrical body with a pair of larger cylindrical end portions integral with the body of the reciprocal member 70. The larger end portions capture the reciprocal member 70 within the end wall 71 of the housing 20. Reciprocal member 70 is aligned with the longitudinal axis 38 of the elongated slot 28, 30 so that the reciprocal member 70 is displaced by the linkage assembly 18 when the rotary clamp 12 is in the clamped position. If power or air is lost to the rotary clamp 12 when in the clamped position, the reciprocal member 70 may be struck to move the linkage assembly 18 toward the unclamped position.

To allow the linkage assembly 18 to move to an over-center position without risking wear of the internal mechanisms of the rotary clamp 12, the present invention provides a wedging assembly that effectively wedges the linkage assembly 18 into the clamped position. This is accomplished by mounting two wear blocks 72 on the outside of the laminated plates 26 just above the guide slot 28 provided in the laminated plates 26. The wear blocks 72 engage the flat landing areas 44 provided on pins 42, 52 when the rotary clamp 12 moves into the clamped position. Further upward pressure is applied to the pins 42, 52 against the wear block 72 by having the roller 54 roll on an inclined surface 74 provided on the lever arm 62 of the shaft link 60. The inclined surface 74 acts as a ramp by which the roller 54 engages and rolls onto when the rotary clamp 12 is moving into the clamped position. By providing the inclined surface 74 on the lever arm 62, the roller 54 provides an increasing force on pins 42, 52 against the wear block 72 while little or no force is applied to links 56. This assures that the clamp 12 is tightly secured when in the clamped position while also ensuring that no excessive wear is occurring to the linkage assembly 18.

In order to provide incremental angular adjustment of the clamp arm 22 in the clamped position, the adjustable pre-stop 10 provides a plurality of predetermined settings by which the clamp arm 22 may be adjusted in the clamped position. The adjustable pre-stop 10 is substantially cylindrical with a stepped diameter that extends between the inner walls of the two bilateral halves 24 of the housing 20. The adjustable pre-stop 10 provides substantially cylindrical end portions 76 having a shaped surface 78 formed adjacent each end portion 76. The shaped surface 78 preferably has a polygonal configuration, such as a hexagon. The middle portion 80 of the adjustable pre-stop 10 comprises an eccentric cylindrical portion which is eccentric relative to a longitudinal axis 81 of the adjustable pre-stop 10. The end portions 76 are received by apertures in the inside walls of the housing 20, and the hexagonal shaped surfaces 78 are received by matingly-engaging, hexagonal shaped apertures 82 also formed in the inside walls of the two halves 24 of the housing 20. The hexagonal shaped apertures 82 are concentric with the apertures in the inside walls of the housing 20. The adjustable pre-stops 10 are secured by threaded fasteners 84 that extend through the bilateral halves 24 of the housing 20 and are threaded into threaded bores 83 in the ends of the adjustable pre-stop 10. The mating engagement of the hexagonal shaped surfaces 78 of the pre-stop 10 with the hexagonal shaped apertures 82 in the housing 20 prohibits the pre-stop 10 from rotating about its longitudinal axis 81.

The eccentricity of the mid-portion 80 of the adjustable pre-stop 10 causes the radius of the mid-portion 80 of the adjustable pre-stop 10 to vary as the adjustable pre-stop 10 rotates. Each time the hexagonal shaped surface 78 of the adjustable pre-stop 10 rotates in a different position with respect to the hexagonal aperture 82 provided in inside walls 24 of the housing 20, the lever arm 62 of the shaft link 60 engages the pre-stop 10 in a slightly different position, thereby causing the angular position of the clamp arm 22 to vary in the clamped position. The six sides of the hexagonal portion 78 allow for six predetermined positions of the adjustable pre-stop 10. A mark, indentation or indicia 86 is provided on the hexagonal shaped surface 78 of the adjustable pre-stop 10 to provide an orientation or reference as to the location of the adjustable pre-stop 10. The indicia 86 ensures the repeatability of the rotary clamp 12 settings once the position of the adjustable pre-stop 10 has been moved or changed.

In operation, a user (not shown) first determines that an adjustment must be made to the position of the clam arm 22 in the clamped position. To adjust the clamp arm 22, the fasteners 84 securing the pre-stop 10 to the housing 20 are removed, and the housing 20 is separated into its bilateral halves 24. The pre-stop 10 is removed from the hexagonal aperture 82 provided in the inner walls of the housing 20 rotated to the desired position. The indicia 86 indicates the position of the pre-stop 10 and the adjustment of the clamp arm 22. The hexagonal shaped surfaces 78 are then seated in the hexagonal shaped apertures 82, and the housing 20 is closed. The fasteners 84 are threaded to secure the pre-stop 10 to the housing 20, and the rotary clamp 12 is ready for use.

While the invention has been described in what is presently considered to be the most practical and preferred embodiment, it is to be understood that the invention is not to be limited to the disclosed embodiments, but to the contrary, it is intended to cover various modifications and equivalent arrangements, included within the spirit and scope of the appended claims. The scope is to be accorded the broadest interpretation so as to encompass all such modifications and equivalent structures as is permitted under the law.

What is claimed is:

1. A rotary clamp comprising:

means for converting linear actuator motion between a first position and a second position into rotary motion of a clamp arm between an unclamped position and a clamped position, respectively;

a housing having said converting means disposed therein and a shaped aperture formed therein;

a substantially cylindrical member having a longitudinal axis and a shaped surface for matingly engaging said shaped aperture in said housing or in a portion of said housing defining said shaped aperture engages said shaped surface to prohibit rotational movement of said cylindrical member about said longitudinal axis; and said cylindrical member having an eccentric outer portion relative to said longitudinal axis for engaging said converting means in said clamped position to prohibit said converting means from moving beyond said clamped position, and said eccentric outer portion creating a plurality of predetermined radial distances from said longitudinal axis to said outer portion corresponding to predetermined rotational positions of said shaped mating surface within said shaped mating aperture, wherein said predetermined radial distances correspond to predetermined incremental angular adjustments of said converting means in said clamped position.

2. The rotary clamp stated in claim 1, wherein each of said shaped surfaces and apertures further comprise:

a substantially polygonal-shaped surface and aperture, respectively.

3. The rotary clamp stated in claim 1, further comprising:

said cylindrical member having a threaded bore in at least one of said ends of said cylindrical member; and at least one fastener extending through a corresponding aperture provided in said housing for threadingly engaging said threaded bore in said cylindrical member and prohibiting movement of said cylindrical member along said longitudinal axis.

4. The rotary clamp stated in claim 1, further comprising:

an indicia formed on said shaped surface of said cylindrical member to indicate the position of said cylindrical member relative to said shaped mating aperture in said housing.

5. The rotary clamp stated in claim 1, wherein said converting means comprises:

a linkage assembly having one end engageable with a linear actuator and another end engageable with a clamp arm.

6. The rotary clamp stated in claim 5, wherein said linkage assembly further comprises:

a shaft link engaging said eccentric outer portion of said cylindrical member in said clamped position.

7. The rotary clamp stated in claim 1, further comprising:

said shaped surface of said cylindrical member being coaxial with said longitudinal axis.

8. A rotary clamp comprising:

a linkage assembly for converting linear actuator motion between the first position and a second position into rotary motion of a clamp arm between an unclamped position and a clamped position, respectively;

a housing having said linkage assembly disposed therein and a pair of polygonal apertures formed therein;

a substantially cylindrical member having a longitudinal axis and a polygonal surface formed at each end of said cylindrical member, wherein said polygonal surfaces matingly engage said polygonal apertures formed in said housing wherein a portion of said housing defining said polygonal apertures engages said polygonal surfaces to prohibit rotational movement of said cylindrical member about said longitudinal axis; and said cylindrical member having an eccentric outer portion formed thereon relative to said longitudinal axis for engaging said linkage assembly in said clamped position and prohibiting said linkage assembly from moving beyond said clamped position, and said eccentric outer portion creating a plurality of predetermined radial distances extending from said longitudinal axis to said outer portion corresponding to predetermined rotational positions of said polygonal surfaces within said polygonal apertures in said housing, or in said predetermined radial distances correspond to predetermined incremental angular adjustments of said linkage assembly in said clamped position.

9. The rotary clamp stated in claim 8, wherein said polygonal shape surfaces and apertures comprise:

substantially hexagonal shaped surfaces and apertures, respectively.

10. The rotary clamp stated in claim 8, further comprising:

said cylindrical member having a threaded bore in each of its ends; and a fastener extending through an aperture provided in opposing interior walls of said housing for threadingly engaging said threaded bores in said cylindrical member and prohibiting movement of said cylindrical member along said longitudinal axis.

11. The rotary clamp stated in claim 8, further comprising:

an indicia formed on said polygonal surface of said cylindrical member to indicate the position of said cylindrical member relative to said polygonal apertures in said housing.

12. The rotary clamp stated in claim 8, further comprising:

said linkage assembly having one of its ends connectable with a linear actuator and another of its ends connectable with a clamp arm.

13. The rotary clamp stated in claim 12, wherein said linkage assembly further comprises:

a shaft link including a lever arm for engaging said eccentric outer portion of said cylindrical member.

14. The rotary clamp stated in claim 8, further comprising:

said polygonal surface of said cylindrical member being coaxial with said longitudinal axis.

15. An improved rotary clamp for securing a workpiece relative to a workpiece support, including a linear actuator having a piston and a piston rod connected thereto for transmitting linear motion; an enclosed housing axially aligned with said linear actuator for receiving said piston rod; a linkage assembly having one of its ends connected to said piston rod and another of its ends connected to a clamp arm, wherein said linkage assembly converts said linear actuator motion between a first position and a second position into rotary clamp motion of said clamp arm between an unclamped position and a clamped position, respectively; the improvement comprising:

a substantially cylindrical member having a longitudinal axis and a shaped surface formed on at least one end of said cylindrical member wherein said shaped surface is coaxial with said longitudinal axis for matingly engaging at least one corresponding shaped aperture formed in at least one inner wall of said housing; and said cylindrical member having an eccentric outer portion relative to said longitudinal axis for engaging said linkage assembly in said clamped position, and said eccentric portion creating a plurality of predetermined radial distances extending from said longitudinal axis to said outer portion corresponding to predetermined rotational positions of said shaped surface within said shaped aperture of said housing, wherein said predetermined radial distances correspond to predetermined incremental angular adjustments of said clamp arm when said linkage assembly engages said cylindrical member in said clamped position.

16. The rotary clamp stated in claim 15, wherein said shaped surfaces and apertures further comprise:

substantially polygonal shaped surfaces and apertures, respectively.

17. The improved rotary clamp stated in claim 15, further comprising:

said cylindrical member having at least one threaded bore in each of said ends of said cylindrical member; and a fastener extending through an aperture provided in at least one interior wall of said housing for threadingly engaging said threaded bore in said cylindrical member and prohibiting movement of said cylindrical member along said longitudinal axis.

18. The rotary clamp stated in claim 15, further comprising:

an indicia formed on said shaped surface of said cylindrical member to indicate the position of said cylindrical member relative to said shaped aperture in said housing.

* * * * *